Nov. 29, 1938.  H. N. OTT  2,138,665
MICROSCOPE
Filed Jan. 4, 1935  3 Sheets-Sheet 2
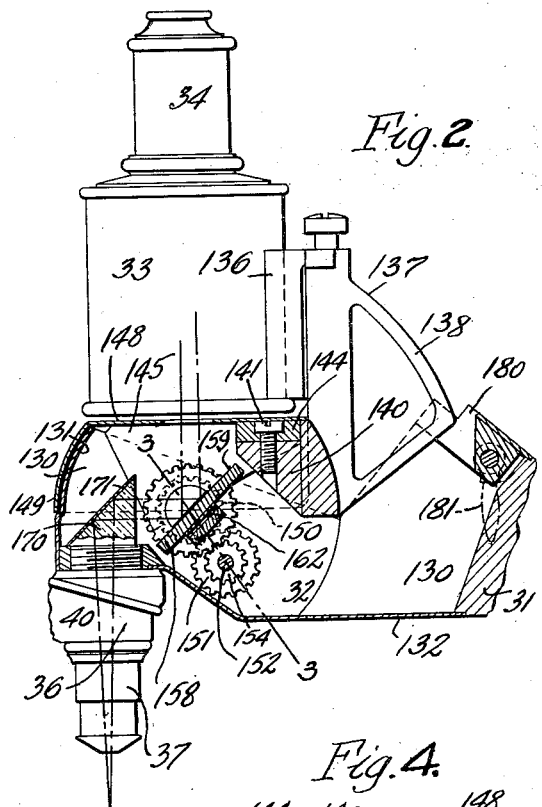
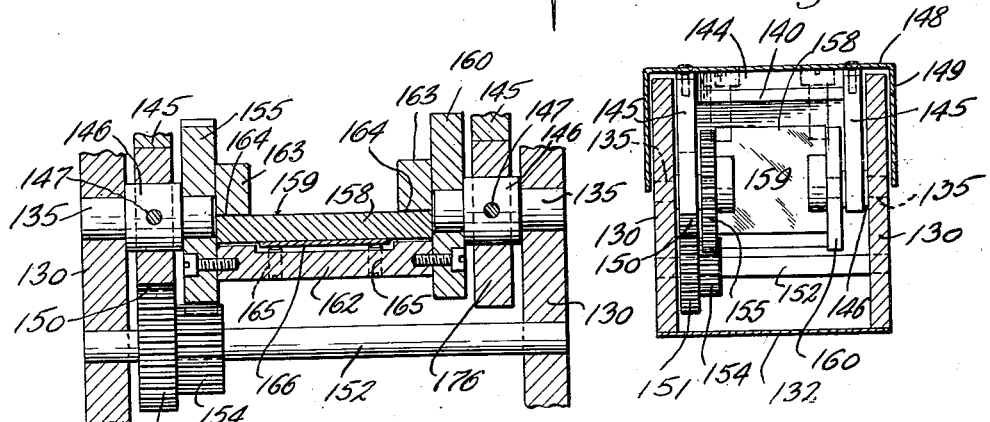
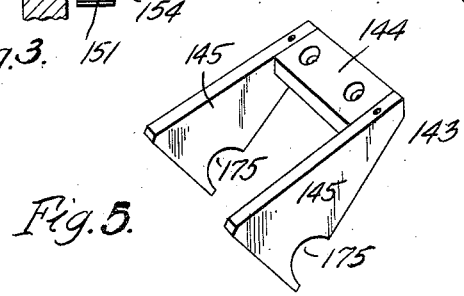
INVENTOR.
Harvey N. Ott
By Parker, Rockwood & Farmer
ATTORNEYS.

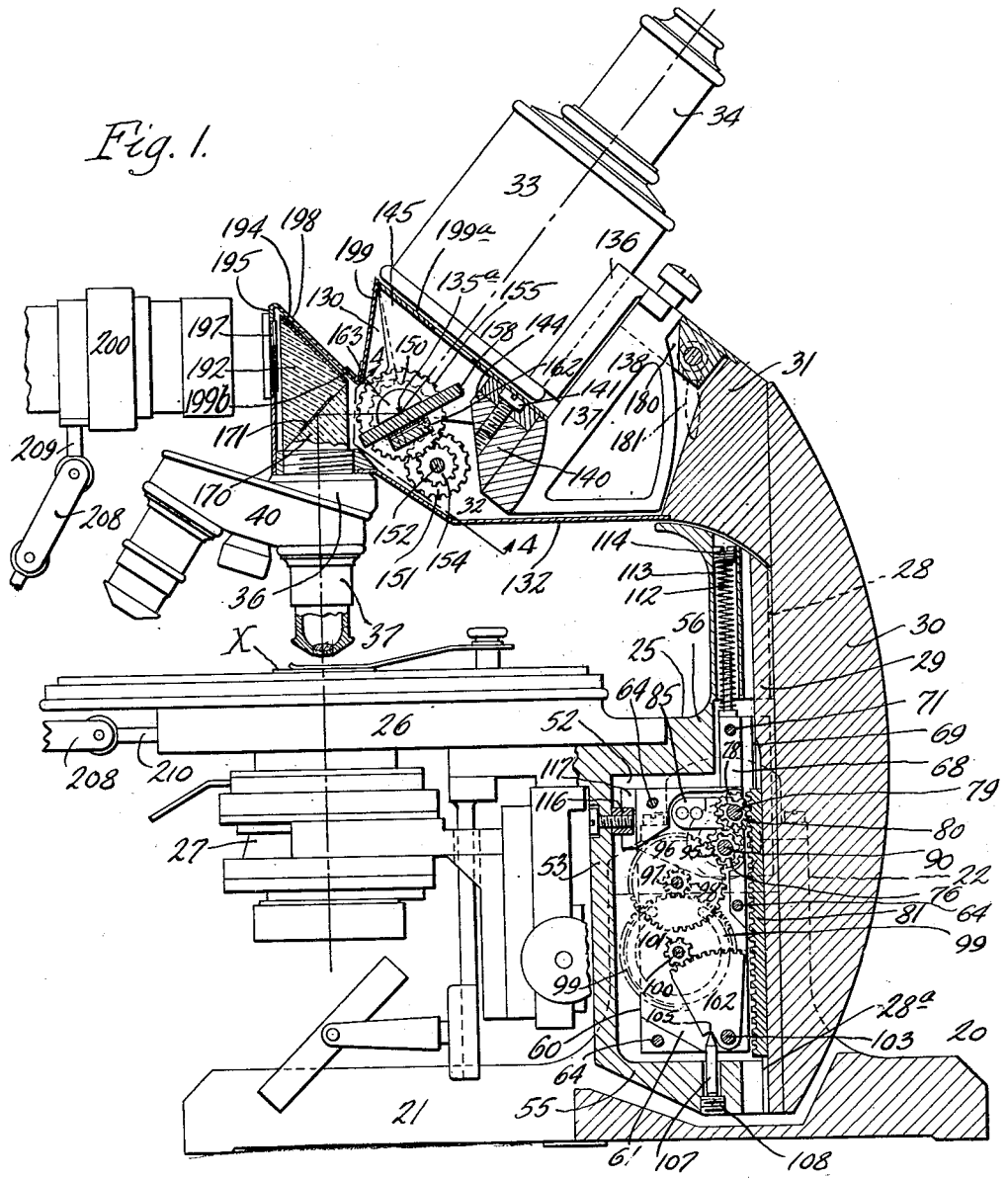

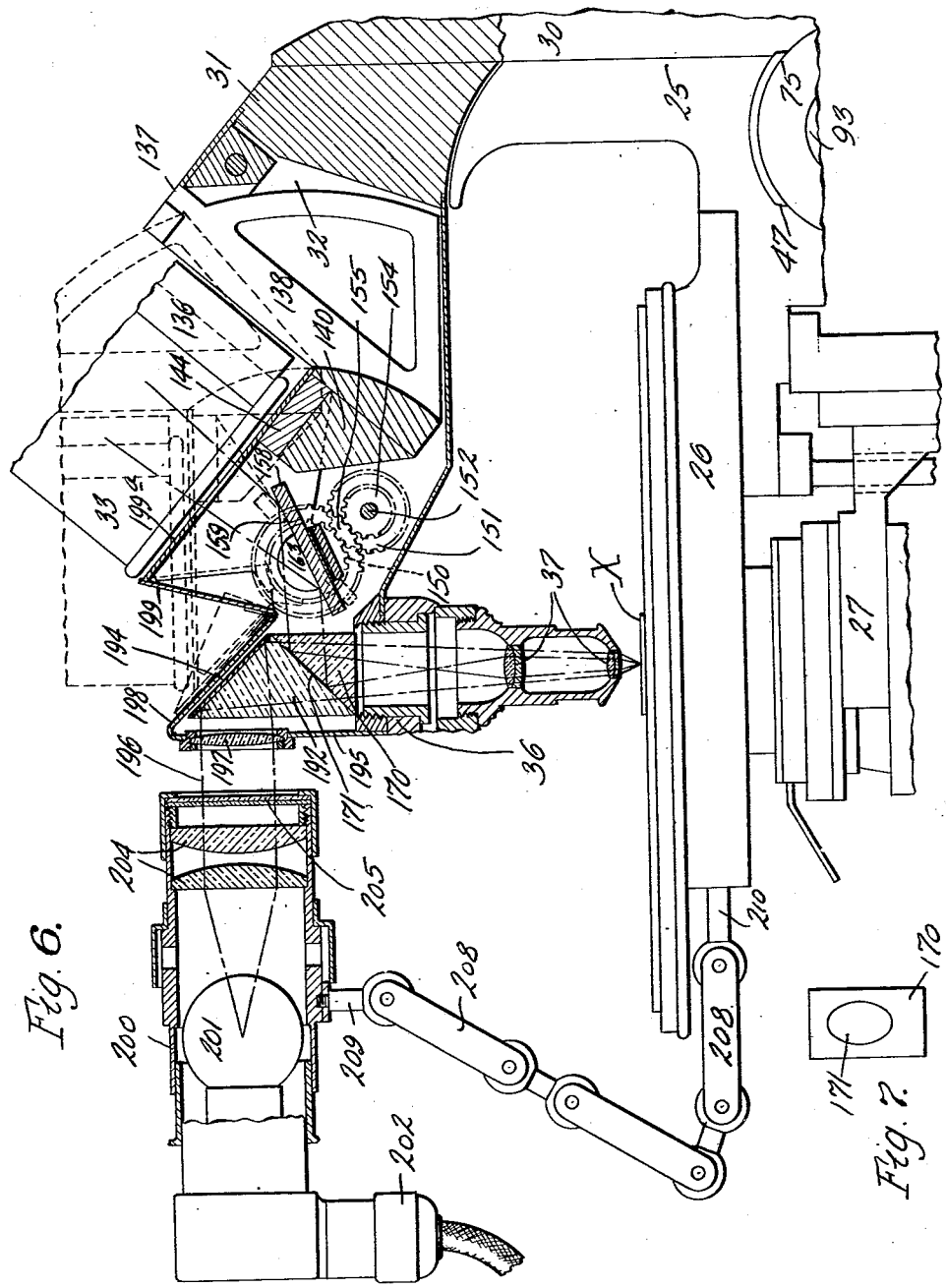

Patented Nov. 29, 1938

2,138,665

UNITED STATES PATENT OFFICE 2,138,665

MICROSCOPE

Harvey N. Ott, Buffalo, N. Y., assignor to Spencer Lens Company, Buffalo, N. Y., Application January 4, 1935, Serial No. 423

3 Claims. (Cl. 88—39)

This invention relates to improvements in microscopes.

It is desirable in microscopes having coarse and fine adjusting mechanisms to locate the operating knobs for such mechanisms near the lower part or base so as to make the manipulation of the knobs as convenient as possible, and so that the hands of the user of the microscope can rest upon the surface upon which the latter rests, to the end that the further advantage of steadiness is ensured while making the adjustments.

It is an object of the present invention to provide a microscope in which the above advantages are attained in a novel and practical manner; in which the knobs for both coarse and fine adjusting mechanisms are disposed in approximately the same position and upon a common axis so that the usual bothersome and annoying groping about from one knob or set of knobs to another knob or set of knobs, while observations are being made through the eyepiece of the instrument, is eliminated.

The type of microscope referred to usually includes a stationary base and an upright arm upon which is mounted the optical system in position to be supported over the stage of the instrument. This supporting arm is movably connected to the base by a transverse, horizontal pivot or inclination joint to enable the arm and the optical system to be tilted relatively to the base in a direction towards and from the user.

Some microscopes of the kind mentioned have been provided with a body tube in which the optical axis of the ocular system or eyepiece is disposed at one side of the optical axis of the objective, and the body tube is mounted independently of the objective mounting or support so that the body tube may be tilted toward and from the user to place the eyepiece into different angular relations to the objective. This arrangement has heretofore necessitated a relatively complicated system of prisms designed to receive the image-forming rays from the objective and deflect them to and direct them along the axis of the eyepiece in all positions of the latter.

Other objects of the invention, therefore, are to provide a microscope in which the image rays from the objective are deflected and directed along the optical axis of and to the eyepiece without the use of a complicated system of prisms; in which such rays are diverted to and along the axis of the eyepiece by a first or direct surface reflector, and in which such means are arranged in a novel, simple and practical manner to enable these rays to be directly reflected or diverted along the eyepiece axis in any angular position of the latter relatively to the axis of the objective.

Various other objects and advantages will be apparent from the following disclosure of an embodiment of the invention, and the novel features thereof will be pointed out in the appended claims.

In the accompanying drawings:

Fig. 1 is a side elevation, partly in section, of a microscope illustrative of this invention.

Fig. 2 is a similar view of the upper portion of the instrument also in the plane of Fig. 1, but with the parts shown in a different adjusted position to that indicated in Fig. 1.

Fig. 3 is a transverse section, on an enlarged scale, taken approximately on the line 3—3, Fig. 2.

Fig. 4 is a transverse section thereof on line 4—4, Fig. 1.

Fig. 5 is a perspective view, detached, of a bracket or supporting member for mounting certain parts of the optical system of the instrument.

Fig. 6 is a transverse, vertical section of the microscope illustrating in detail the illuminating features thereof.

Fig. 7 is a face view of a reflecting element used in connection with the optical system of the instrument of Fig. 6.

The microscope shown in the drawings for illustrating the invention is of the compound type, and comprises, in general, a stand or support 20 provided with a foot 21 of conventional horseshoe formation and from which there projects upwardly a pair of posts 22. Journalled upon and between these posts 22 for swinging movement about the transverse horizontal axis 23 of an inclination joint is an intermediate member or support 25 on which is mounted a stage 26 for the specimen or object X to be examined, and below which may be arranged a condenser 27 supported upon the intermediate member 25 for movement toward and from the stage by an adjustable sliding connection. The parts 26—27 just described are of the conventional sort employed upon microscopes and form no part of the present invention.

The intermediate supporting member 25 is provided at the rear thereof with upper and lower pairs of opposed upright guide grooves 28 and 28a respectively within which is slidably arranged a dovetail or bar 29 rigidly secured to the front face of an upright arm 30. At the upper end of said arm 30 there is detachably secured a bracket 31 supporting a forwardly extending housing 32 disposed above the stage 26. A body member 33 carrying an eyepiece or ocular system 34 of any usual or suitable construction is in turn movably mounted at the upper part of the housing 32. As will be seen upon reference to Figs. 1 and 2, this body tube 33, together with its eyepiece 34 is adjustable from a position in which the axis of the eyepiece extends vertically to a position in which the axis of the eyepiece is tilted rearwardly or in a direction towards the user of the instrument. The two views mentioned illustrate the extreme positions of the body tube 33 and eyepiece 34, and these parts may be used in any intermediate position between these two extremes.

At the lower forward end of the housing 32, below the body tube 33, there is provided a lens tube 36 having at its lower end a relatively fixed objective 37, the axis of which, when the parts are in the position shown in Fig. 13, is disposed forwardly of, or in a different plane to, but parallel with, the then vertical axis of the body tube and eyepiece.

While the lens tube 36 and objective 37 are shown in connection with a nosepiece 40, the parts 36 and 37 can, if desired, be used without the nosepiece, in which case only one objective at a time is carried upon the instrument.

In the intermediate supporting member 25, there is formed a recess or cavity 52 which is bounded by walls 53, 54 and 55.

Within said recess 52 and in spaced relation to the walls thereof is arranged a block or member 60 upon which the various parts of the coarse and fine adjusting mechanism are mounted. This member or block is formed of two similar, upright, substantially parallel plates 61 secured by suitable screws or fastening devices 64 engaging in horizontal alined holes in the two plates.

Each of the plates 61 is provided with an upper extension 68 in which is formed an upright dovetail guide or groove 69. The two guides together fit or embrace the opposite bevelled edges of the aforementioned dovetail 29 of the arm 30, and are forced into firm gripping contact with the dovetail 29 of the arm 30 by a screw 71.

The coarse adjusting mechanism shown in the drawings comprises a pair of horizontal, alined revoluble sleeves or adjusting members which are journalled in the block 60, and at its inner end each sleeve has a pinion 76. Each of these pinions 76 is arranged to mesh with corresponding pinions 78 secured upon opposite ends of a horizontal jack shaft 79 suitably journalled at the upper end of the member 60. Fixed upon the jack shaft 79 between and in spaced relation to the pinions 78 is another pinion 80 which meshes with an upright rack bar 81 fixed to the front face of the dovetail 29 of the arm 30. Upon rotation of either one of the sleeves 73, therefore, the jack shaft will be turned and its pinion 80, by engagement with said rack, will shift the arm 30 up and down, depending upon the direction of rotation of the knob 75 of that sleeve 73 which was rotated.

The jack shaft 79 may be rotatably mounted upon the block 60 in bearings 85.

The fine adjusting mechanism for the arm 30 and its optical system includes a transverse, horizontal shaft 90, and on that intermediate portion of said shaft 90 which is exposed between the two pinions 76 of the sleeves 73, there is fixed a pinion 95 which meshes with a gear 96. This gear 96 is fixed upon a short horizontal shaft 97 journalled in the block 60. Also fixed upon said shaft 97 alongside the gear 96, is a pinion 98 which, in turn, meshes with a gear 99 fixed upon a second horizontal shaft 100 similarly mounted. This shaft 100 also has fixed thereupon a pinion 101 which is arranged to mesh with the teeth of a gear sector 102 fixed upon another horizontal shaft or pivot 103. The pivot or shaft 103 is also journalled in the block 60.

The pivot 103 is disposed near the lower end of the member 60, and its sector 102 is provided with a downwardly facing shoulder or notch 105 into the angle or bottom of which there extends the upper pointed end of an abutment or fulcrum member 107 in the form of a substantially vertical pin, the lower end of which is also pointed and is received upon a conical seat in a screw plug 108 secured in the bottom wall 55 of the recess 52. The fulcrum member or abutment 107 therefore comprises the support upon which the member 60 rests.

To overcome or counterbalance to some extent the dead weight of the arm 30 and the parts mounted thereon, together with that of the member 60, I arrange means including a tension coil spring 112 which is arranged in a hole 113 in the upper part of the intermediate member 25 in a position to react against a screw plug 114 at the upper end of said hole and the adjacent upper portions of the two extensions 68 of the member 60.

I provide on the inner face of the upright wall 53 of the recess 52 a guide block 116 against which opposed vertical faces 117 upon the block 60 slideably engage for preventing lateral displacement of the member 60 relatively to the member 25 and to assist it in its up and down movements.

The above described arrangement provides a very practical and compact structure wherein the coarse and fine adjusting mechanisms, while being entirely enclosed in the recess 52, can nevertheless be completely assembled as a unit upon the block 60 and the assembly placed into position through the open, rear end of said recess 52 before the arm 30 is placed into position. Then, as the dovetail 28 of the arm is engaged in its guides 28a it passes through the guideways 69 of the block 60. By then turning the screw 71, the guides 69 can be clamped upon the dovetail with the required pressure to effect the proper operative connection between the arm 30 and the fine adjusting mechanism.

As before mentioned, the body tube 33 upon which the ocular system or eyepiece 34 is mounted, can be tilted in a fore and aft direction, upon the housing 32 toward and from the user. As clearly shown, the housing includes a pair of spaced parallel, vertical side plates 130 extending forwardly from or forming part of the bracket 32. The front upright edges of the side plates 130 may be connected by a curved closure or wall 131 as in Fig. 2, while the bottom edges of said side plates are similarly connected by the bottom wall 132.

Journalled on and extending inwardly from each of the side plates 130 is a short, horizontal shaft 135, both of which shafts are alined upon a common axis, indicated at 135a. The body tube 33 is provided at its rear side with an upright tongue or part 136 which is removably mounted in a guide or support 137 which is formed with opposite parallel side faces 138. The guide 137 extends between the inner parallel faces of the side plates 130 at the rear of the housing 32. At its lower end the guide or support 137 is provided with a cross bar 140 to which is rigidly secured, as by screws 141, a bridge member or bracket 143 comprising a horizontal, transverse connecting portion 144 and opposite parallel side arms 145 which extend between the side plates 130 in spaced relation thereto, as clearly shown in Fig. 3.

In the construction shown in Fig. 2 the housing 32 is completed by a hood or cap having an upper wall 148 which connects the upper edges of the side plates 130 and a front wall 149 which telescopes over the front wall 131. The top wall is secured to the transverse portion 144 of the bracket 143, and is provided with a hole disposed concentrically upon the axis of the eyepiece 34.

The housing, as just described, is desirable when the microscope is used without the illuminating means later described, but when such illuminating means is employed, I prefer to construct the housing as illustrated in Figs. 1 and 6.

The arms 145 are apertured to receive enlargements 146 on the shafts 135, the shafts being rigidly secured to the arms by pins 147 passing through said enlargements. One of the arms 145 is provided with a gear sector 150 which is concentric with the axis of the shafts 135, the sector being arranged to mesh with a spur gear 151 upon a horizontal shaft 152 journalled in holes in the side plates 130 and extending parallel with the shafts 135, below and somewhat to the rear of said shafts. The pitch diameter of the sector 150 and its companion gear 151 are the same. To one side of the gear 151 the shaft 152 is provided with the pinion 154 which, in turn, meshes with a gear wheel 155 journalled upon the inner end of and rotatable relatively to one of the pivot shafts 135.

The axis 135a of the shafts 135 constitutes the pivotal axis of the body tube 33. This axis 135a is disposed upon or extends horizontally through the longitudinal axis of the body tube 33 and eyepieces 34. By oscillating the body tube forwardly and rearwardly, the same will turn about said axis 135a and, in so doing, will through the relative proportions of the segment 150, gear 151, pinion 154 and gear 155, cause the latter gear to rotate at half the peripheral speed of the sector 150. This arrangement and relative rotary movement of the gears is utilized for the purpose of correspondingly shifting a reflecting element positioned in the optical axis of the eyepiece 34 so that said element can reflect image forming rays from the objective 37 along said axis of the eyepiece regardless of the angular position to which the body tube and eyepiece may be shifted relatively to the axis of the objective 37.

For this purpose, I provide a suitable reflecting element 158 of the first or direct reflecting type consisting of a flat plate or suitable material having a direct reflecting surface 159. This surface may be of any suitable kind formed, for example, by coating a glass or metal plate with platinum or aluminum, or the element may consist of a piece of polished stellite. This surface 159, as shown, lies in or passes transversely across the optical axis of the eyepiece 34, and the pivotal axis 135a of the body tube in turn lies upon this face. In order to support the element 158 for the purpose described, I support the same in any suitable manner upon the inner ends of the two shafts 135 between the gear 155 and a disk or member 160 on the other shaft 135 so as to move with the gear 155. The gear 155 and disk 160 are connected by a cross piece 162 having at each end offset portions 163 which are slotted at 164 to receive the opposite side edge portions of the reflecting element 158. The element is releasably secured in said slots by screws 165 extending through the cross piece and bearing against a pad 166 engaging the back face of the element 158 so as to press the upper face of said element 158 against the top walls of the grooves 164.

Stationarily arranged upon the optical axis of the objective 37 at the upper end of the lens tube 36, and preferably within the housing 33, is a prism 170 having an inclined reflecting face 171 arranged at 45° to the optical axis of the objective 37 and disposed so as to divert or reflect image-forming rays from the objective horizontally in a rearward direction. When the eyepiece 34 and body tube are in a vertical position shown in Fig. 2, with the optical axis of the eyepiece 34 extending parallel with the optical axis of the objective 37, the reflecting face 159 of the element 158 is disposed at an angle of 45° to the axis of the eyepiece 34 and parallel with the reflecting surface 171 of the prism 170. In this position of the parts, the reflected rays from the prism 170 impinge upon the reflecting surface 159 of the element 158 at an angle of 45° to said element and are reflected therefrom at an equal angle along the axis of and into the eyepiece 34.

For practical reasons I may elect to form the gear sector 150 by utilizing a gear wheel, which is rigidly secured as by welding or soldering a portion of the periphery thereof in an arcuate recess 175 in one of the arms 145 of the bracket 143. The other arm 145 is similarly recessed to receive a disk 176 of similar diameter to the gear forming the sector 150, and this may have gear teeth formed thereon so as to thereby permit the gear 151 and pinion 154 to be arranged at either the right or left hand side of the shaft 152, as desired. Similarly, the disk 160 may, if desired, have gear teeth corresponding to the teeth of the gear 155 for operative engagement with the pinion 154 when the latter is used at the other side of the shaft 152. However, no teeth are shown on the disks 160, 176. Obviously, the gear sector 150 and a part corresponding to the disk 170 may be formed as integral parts of the arms 145.

The body tube 33 may be secured in any of its angularly adjusted positions by suitable clamp jaws 180 which may be shifted into and out of gripping engagement with the side faces 138 of the support 137 by a handle 181, in a well known manner.

The construction described provides a practical and very efficient means for reflecting and directing the image forming rays from the objective to the eyepiece in any position of body tube relative to the objective. The adjusting means comprises relatively few inexpensive gears and parts, and only two reflecting elements are required, as compared with several in microscopes heretofore produced.

In Figs. 1 and 6, I illustrate in detail practical and desirable means whereby an object arranged upon the stage 26 of the instrument can be illuminated by a concentrated beam of light directed into and passing downwardly through the lens tube 36 in which the objective 37 is mounted.

For this purpose, a second right angle prism 192 is mounted in the housing 193 with one of its sides arranged in inclined parallel relation to the inclined face of the prism 170 and preferably in contact therewith. The face of said prism 192 which extends at right angles to the inclined face thereof just described is also arranged upon the axis of the objective 37 and acts as a reflecting surface 194. This surface is arranged at the 45° inclination shown so that the base of the prism extends vertically and faces toward a side wall 195 of the housing. The side wall 195 is provided with a suitable lens 197 through which a cylindrical beam of light 196 is directed so as to pass through the base of the prism to the reflecting face 194 thereof. Since the inclined reflecting face 194 extends across the axis of the objective 37 the rays of light forming the beam 196 will be reflected by this surface 194 downwardly through prism 170 and the lens tube along the axis of and through the objective 37 and thus will illuminate the object upon the stage.

The opaque reflecting surface 171 of the prism 170 is, as shown in Fig. 7, of approximately elliptical form and is of such dimensions that the periphery of this reflecting surface lies well within the beam of light passing downwardly through the lens tube. This arrangement is such that the opaque reflecting surface 171 will obstruct and prevent those rays of light forming the interior of the beam from passing beyond the surface 171 to the objective 37 and only those portions of the beam extending outwardly beyond the edges of the surface 171 wil reach said objective. In this manner, the light reaching the objective will be in a form of a hollow cone, the walls of which may be of substantially the same thickness throughout since the elliptical reflecting surface 171 being disposed at 45° to the axis of the beam, forms or produces a substantially circular obstruction when viewed along the optical axis of the objective 37.

The objective, in order to be effective, must, of course, be adjusted into focus with the object. It follows that the hollow beam or cone of light passing through the objective will produce a localized and strongly concentrated light area upon the object for illuminating it.

Under these conditions, the illuminated object X on the stage, being in the focus of the objective 37, the image rays therefrom, will, as shown in Fig. 6, pass upwardly from the objective through the central portion of the lens tube 36, as usual. These image forming rays therefore will pass along the optical axis and within the hollow beam of light coming in the opposite direction without intermingling therewith.

The housing 193 is formed with a fixed top wall 198 inclined in parallel relation to and adjacent the face 194 of the prism 192, and at the lower edge thereof there is a spring-hinged cover plate 199 the spring 199b of which bears upon the plate and yieldingly holds it against the wall 199a of the housing to close the housing. By this construction the housing will be closed at all times, since the cover 199 will move with the body tube when it is adjusted to different angular positions.

Any suitable means may be used for providing the source of light, that shown in the drawings, see Figs. 1 and 6, comprises a tube or housing 200 having an electric lamp or bulb 201 suitably mounted therein and which is supplied with electric current by means of the standard attachment 202.

There is arranged in the tube or housing 200, in line with the lamp 201, a pair of condensing lenses 204 through which the rays of light pass from the lamp 201 through the adjacent end of the housing 200, which may be provided with a closure cap having a transverse glass wall 205.

In use the illuminating device is arranged so that the lamp 201 and the condensing lenses are disposed opposite the lens 197 of the microscope, with the optical axis of the lamp, the condenser and said lens 197 in approximately coincidental relation so that the resulting cylindrical beam of light 196 will be properly directed against the reflecting surface 194 of the prism 192 and thence be reflected downwardly thereby through the lens tube 36 and the objective 37. The lens 197 is preferably of such form as to cause the rays forming the beam of light 196 to converge somewhat after passing therethrough so that the beam of light passing downwardly from the reflector 194 will be of conical or tapering form, thereby more effectively concentrating the light which passes through the objective.

The illuminating device can be supported in any suitable way in order to enable it to be adjusted and placed in the proper operative relation to the lens 197 and prism 192, this being effected in the construction shown by a series of articulated members 208 having universal joint connections with each other, the series being connected at one end by a fitting 209 to the housing 200 of the illuminating device and at its other end by a fitting 210 to the stage 26 of the microscope.

While the invention has been illustrated in connection with a microscope of the compound type, it will be obvious that some features thereof are equally adapted for use in microscopes of other types.

I claim as my invention:

1. In a microscope, an objective, a mounting therefor, an ocular system, a body member upon which the latter is mounted, a reflecting element mounted in fixed relation to said objective for receiving image rays from said objective and diverting them at an angle to the axis of said objective, a first surface reflector, a support therefor pivotally mounted in said body member to support said reflector in position to receive said diverted rays and direct them along the axis of said ocular system, a relatively stationary main support, a pivotal connection between the same and said body member, the axis of which pivot coincides with the axis of said reflector mounting so that said body tube may be swung about said pivot to place said ocular system into different angular relations to said objective, and reflector actuating means, including gearing carried by said main support and operatively engaging said body member and said first surface reflector mounting, said gearing being in two to one ratio and movable by said swinging movements of said body member to transmit motion to said reflector support to shift said first surface reflector through one-half the angular displacement relatively to said objective through which said ocular system is moved by said body member movements, wnereby the rays leaving said reflector will continue to be directed along the axis of said ocular system in the different operative angular positions of said body member.

2. In a microscope, an objective, a mounting therefor, an ocular system, a body member upon which the latter is mounted, a reflecting element mounted in fixed relation to said objective for receiving image rays from said objective and diverting them at an angle to the axis of said objective, a first surface reflector, a support therefor pivotally mounted in said body member to support said reflector in position to receive said diverted rays and direct them along the axis of said ocular system, a relatively stationary main support, a pivotal connection between the same and said body member, the axis of which pivot coincides with the axis of said reflector mounting so that said body tube may be swung about said pivot to place said ocular system into different angular relations to said objective, and reflector actuating means including a shaft pivoted in said main support and having thereon two gears proportioned in two to one ratio, a gear section on said body member meshing with the larger of said gears, a gear section on said first surface reflector support meshing with said other gear, whereby angular adjustments of said body member and its ocular system about said body member pivot, will, through said gears, shift said first surface reflector through one-half the angular displacement of said body member in its adjustments, so that rays leaving said reflector will continue to be directed along the axis of said ocular system.

3. In a microscope, a relatively stationary objective, a main support, a body member pivoted thereon and carrying an ocular system, which when said body member is moved about its pivot, may be placed so that the axis thereof is in different angular relations to the axis of said objective, spaced parallel side walls on said main support, similar parts on said body member which fit between said support walls and turn with said body member, a reflector system disposed in the space formed between said pairs of walls, a cover extending across said space and engaging edges of the two walls on said body member to close said space at that side thereof, said cover having a spring hinge by which it is yieldingly held against said edges and by which it is retained in contact therewith in movements of said body member relatively to said main support and by which it may be moved out of engagement with said wall edges to afford access to said reflector system.

HARVEY N. OTT.